United States Patent [19]

Ishii et al.

[11] Patent Number: 5,182,507
[45] Date of Patent: Jan. 26, 1993

[54] STEPPING MOTOR DRIVING CIRCUIT HAVING FAILSAFE FUNCTION

[75] Inventors: Yukihisa Ishii; Yetsuya Oono; Shinichi Inagawa, all of Wako, Japan

[73] Assignee: Honda Giken Kogyo K.K., Tokyo, Japan

[21] Appl. No.: 735,436

[22] Filed: Jul. 25, 1991

[30] Foreign Application Priority Data

Aug. 9, 1990 [JP] Japan ................ 2-212231

[51] Int. Cl.$^5$ ............................................. G05B 19/40
[52] U.S. Cl. ........................................ 318/685; 318/696
[58] Field of Search ................................. 318/685, 696

[56] References Cited

U.S. PATENT DOCUMENTS 4,358,725 11/1982 Brendemuehl ............... 318/685
4,423,366 12/1983 Gottwald ....................... 318/685
4,710,690 12/1987 Reid et al. ..................... 318/685

Primary Examiner—William M. Shoop, Jr.
Assistant Examiner—Karen Masih
Attorney, Agent, or Firm—Arthur L. Lessler

[57] ABSTRACT

A driving circuit for driving a stepping motor has a plurality of excitation coils, a plurality of excitation transistors for driving the excitation coils of the stepping motor, respectively, and at least one chopping transistor for effecting chopping control of current flowing to the excitation coils. A fault diagnosis transistor is connected in parallel with the chopping transistor. A current limiting resistance is serially connected to the fault diagnosis transistor. A CPU selectively turns on and off the fault diagnosis transistor. The CPU detects output states of the chopping transistor assumed respectively when the fault diagnosis transistor is turned on and turned off. The CPU compares the detected output levels of the chopping transistor with respective predetermined logic levels and detects faults in the driving circuit from results of the comparisons.

9 Claims, 6 Drawing Sheets

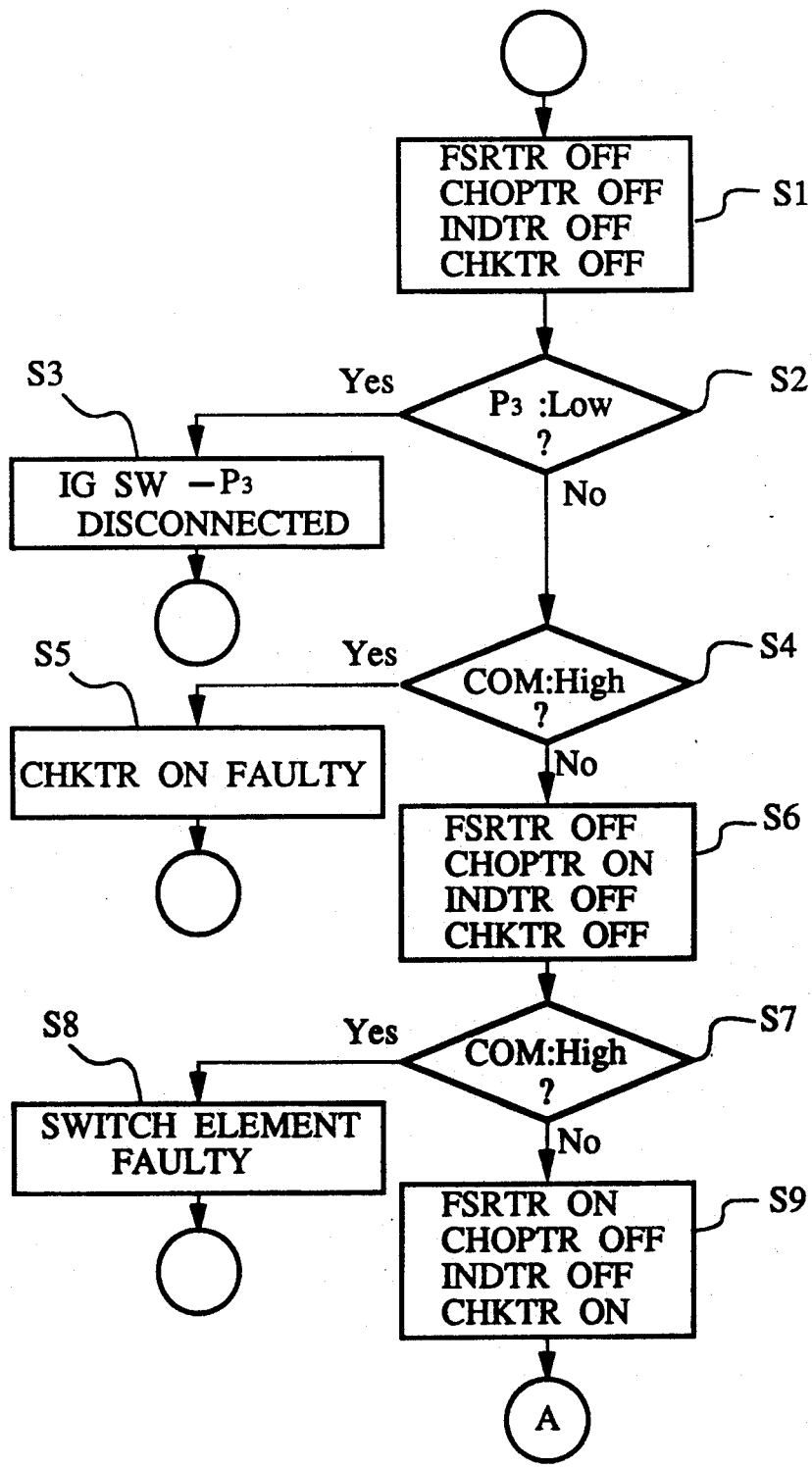

STEPPING MOTOR DRIVING CIRCUIT HAVING FAILSAFE FUNCTION

BACKGROUND OF THE INVENTION

This invention relates to a driving circuit for driving a stepping motor, and more particularly to a stepping motor driving circuit which has a failsafe function for protecting the circuit in the event of an electrical fault in the circuit.

Conventionally, a stepping motor driving circuit is generally provided with a protective device which is operable to protect the circuit in the event of a short circuit between a circuit element and wiring or the like, by preventing the stepping motor and/or circuit elements from being damaged or broken by excessive current (overcurrent) flowing in the motor and/or the circuit elements.

The conventional protective device includes the following types:

i) a type employing a fuse which is cut by overcurrent;

ii) a type employing a resistance having a low resistance value and arranged in the driving circuit at a suitable place for detecting overcurrent such that a relay or like means is actuated upon desection of overcurrent by the resistance to cut off the supply of driving current to the stepping motor; and iii) a type having means for applying driving pulses to the stepping motor and detecting the rotational angle of the motor driven by the pulses, means for detecting a fault in the driving circuit based upon the detected rotational angle and the number of driving pulses applied to the motor, and means for cutting off the supply of driving current to the motor upon detection of a fault.

The above type i) suffers from low responsiveness, and the type ii) has a drawback of large heat loss due to the use of a resistance. On the other hand, the type iii) is not capable of selectively detecting only electrical faults, since it can erroneously judge that a fault has occurred, even when the means for detecting the rotational angle becomes faulty, when the motor skips, or when there takes place a mechanical fault.

Further, all the above-mentioned types are adapted to detect a fault only after excessive current has flown due to occurrence of the fault. Therefore, the motor and its related parts can be broken or damaged before a fault is detected.

SUMMARY OF THE INVENTION

It is the object of the invention to provide a stepping motor driving circuit, which has a failsafe means which is capable of promptly and selectively detecting only electrical faults, without causing breakage of or damage to the motor and/or its related parts due to overcurrent, etc.

To attain the above object, the present invention provides a driving circuit for driving a stepping motor having a plurality of excitation coils having different phases, comprising:

a plurality of excitation transistors for driving the excitation coils of the stepping motor, respectively;

at least one chopping transistor for effecting chopping control of current flowing to the excitation coils;

a fault diagnosis transistor connected in parallel with the chopping transistor;

current limiting means serially connected to the fault diagnosis transistor;

switching control means for selectively turning on and off the fault diagnosis transistor;

output state detecting means for detecting output states of the chopping transistor assumed respectively when the fault diagnosis transistor is turned on and turned off; and fault detecting means for comparing the detected output levels of the chopping transistor with respective predetermined logic levels and detecting faults in the driving circuit from results of the comparisons.

The above and other objects, features, and advantages of the invention will be more apparent from the ensuing detailed description taken in conjunction with the accompanying drawings.

DETAILED DESCRIPTION

The invention will now be described in detail with reference to &he drawings showing an embodiment thereof.

Figure 1:
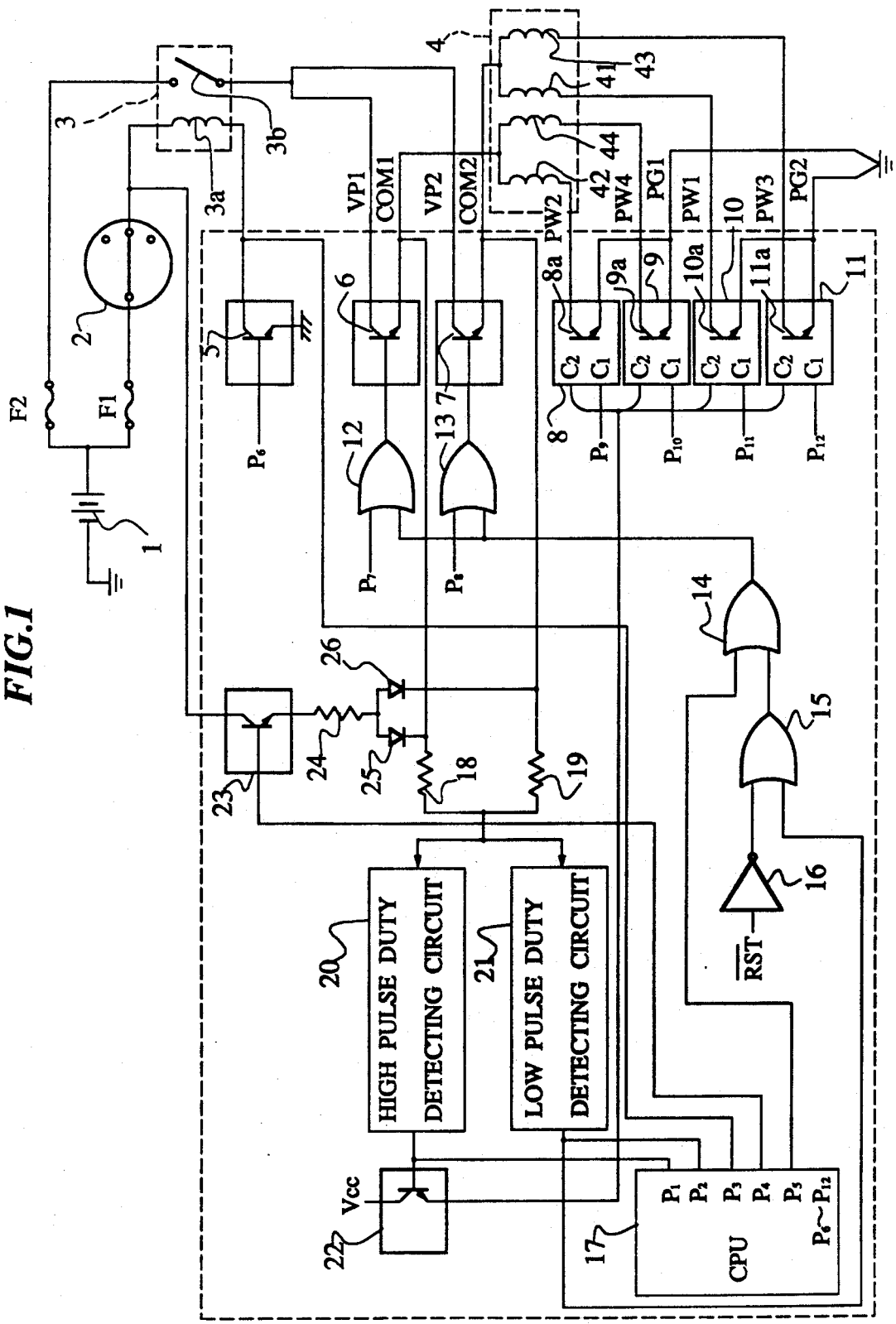
FIG. 1 is a circuit diagram of a stepping motor driving circuit according to an embodiment of the invention.

Referring first to FIG. 1, there is shown the arrangement of a stepping motor and a driving circuit for driving same according to an embodiment of the invention. The stepping motor in the illustrated embodiment is adapted for use in automotive vehicles.

In the figure, reference numeral 1 designates a battery, which has a negative electrode thereof grounded and a positive electrode thereof connected to an ignition switch 2 of an automotive vehicle, not shown, and a switch element 3b of a relay 3 via fuses $F_1$ and $F_2$, respectively. The ignition switch 2 is connected to a coil 3a of the relay 3. The coil 3a is in turn connected to the collector of a failsafe relay transistor (hereinafter referred to as "FSRTR") 5, as well as to an input port $P_3$ of a central processing unit (hereinafter referred to as "CPU") 17. The FSRTR 5 has its emitter grounded and its base connected to an output port $P_6$ of the CPU 17. With this arrangement, the FSRTR 5 is controlled to turn on and off by the CPU 17. When it is turned on, the switch element 3b of the relay 3 is closed.

The switch element 3b of the relay 3 is connected to chopping transistors (hereinafter referred to as "CHOPTR") 6, 7 by way of respective lines VPI and VP2. The CHOPTR's 6, 7 have their collectors connected to second phase excitation coils 42 and 44, and first phase excitation coils 41 and 43 of a stepping motor 4, by way of respective lines $COM_1$ and $COM_2$. The CHOPTR's 6, 7 have their bases connected to the output terminals of respective OR circuits 12 and 13. The OR circuits 12, 13 have one input terminals thereof connected to output ports $P_7$ and $P_8$ of the CPU 17, respectively, and other input terminals connected to the output of an OR circuit 14. The OR circuit 14 has one input terminal thereof connected to an output port P5 of the CPU 17, and another input terminal connected to the output of an or circuit 15. The output ports P7, P8 supply low level signals except when the CPU 17 carries Out a fault diagnosis, and the OR circuit 15 generates a low level output except when a low pulse duty factor detecting circuit 21, hereinafter referred to, has detected a fault. Therefore, the CHOPTR's 2, 7 are controlled to turn on and off by a chopping pulse signal from the output port P5 of the CPU 17. The chopping pulse signal has its pulse duty factor variable in response to output voltage $V_B$ from the battery 1 so that pulse duty factors of pulse signals on the lines $COM_1$, $COM_2$ are controlled within a predetermined range (3%–93% in the present embodiment). Thus, constant effective power is supplied to the stepping motor 4, irrespective of the output voltage $V_B$ from the battery 1.

Figure 2:
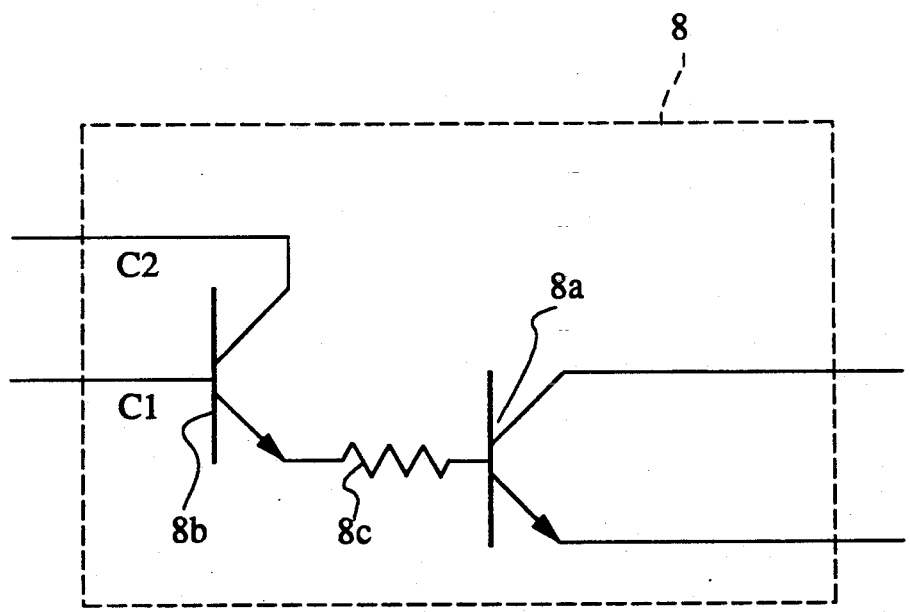
FIG. 2 is a circuit diagram showing the interior construction of a motor exciting circuit appearing in FIG. 1.

The excitation coils 41–44 of the stepping motor 4 are connected to the collectors of excitation transistors 10a, 8a, 11a and 9a (hereinafter referred to as "EXTR") of motor exciting circuits 10, 8, 11 and 9, respectively. As shown in FIG. 2, the motor exciting circuit 8 comprises an EXTR 8a, a control transistor (hereinafter referred to as "CONTTR") 8b, and a resistance 8c. The emitter of the CONTTR 8b is connected to the base of the EXTR 8a via the resistance 8c, while the base and collector of the CONTTR 8b are connected to control input terminals $C_1$ and $C_2$ of the motor exciting circuit 8.

The other motor exciting circuits 9–11 have exactly the same construction with that of the motor exciting circuit 8, described above. The emitters of the EXTR's 8a–11a are grounded via respective lines PG1 and PG2.

The first control input terminals $C_1$ of the motor exciting circuits 8–11 are connected to respective output terminals $P_9-P_{12}$ of the CPU 17, and the second control input terminals $C_2$ thereof are connected to the collector of a (hereinafter referred to as "PCUTTR") 22. The PCUTTR 22 has its emitter connected to a power supply Vcc which supplies positive voltage. With this arrangement, when the PCUTTR 22 is on, the second control input terminals $C_2$ of the exciting circuits 9–11 assume a high potential so that the EXTR's 8a–11a are turned on and off in response to pulse signals from the output ports $P_9-P_{12}$ of the CPU 17 connected to the first control input terminals $C_1$. Consequently, the exciting coils 41–44 are energized to drive the stepping motor 4.

The lines $COM_1$, $COM_2$ to which the collectors of the CHOPTR's 6, 7 are connected are connected to ends of respective resistances 18 and 19, which in turn have the other ends thereof connected with each other and also connected to input terminals of a high pulse duty factor detecting circuit (hereinafter referred to as "HDTY circuit") 20 and the low pulse duty factor detecting circuit (hereinafter referred to as "LDTY circuit") 21. The output of the HDTY circuit 20 is connected to the base of the PCUTTR 22 and to an input port $P_1$ of the CPU 17. The output of the LDTY circuit 21 is connected to an input port $P_2$ of the CPU 17 and one input terminal of the OR circuit 15. The OR circuit 15 has another input terminal thereof supplied with a resetting signal RST from resetting means, not shown, via an invertor 16, so that when reset, the invertor 16 generates a high level output. The output of the OR circuit 15 is connected to another input terminal of the OR circuit 14.

Figure 3:
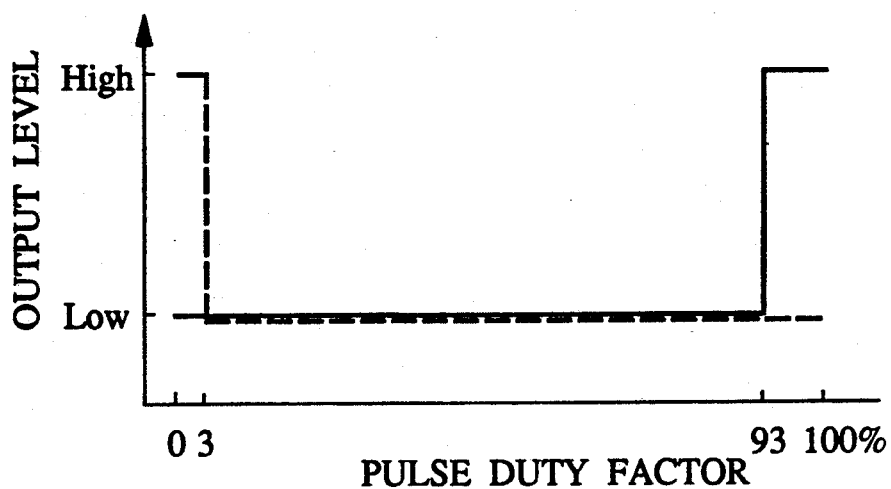
FIG. 3 is a graph showing input and output characteristics of a high pulse duty factor-detecting circuit and a low pulse duty factor-detecting circuit appearing in FIG. 1.

The HDTY circuit 20 and the LDTY circuit 21 have input and output characteristics as shown by the solid line and the broken line, respectively, in FIG. 3. More specifically, when the pulse duty factor of either one of the pulse signals on the lines $COM_1$, $COM_2$ exceeds 93%, the HDTY circuit 20 generates a high level output, whereas when the former is equal to or lower than 93%, the latter generates a low level output. On the other hand, the LDTY circuit 2 generates a high level output when the pulse duty factor of either one of the pulse signals on the lines $COM_1$, $COM_2$ is below 3%, and a low level output when the pulse duty factor is equal to or higher than 3%. Therefore, in the event of a short circuit between the emitter and the collector of the CHOPTR 6, for example, the pulse duty factor becomes 100%, and accordingly the output from the HDTY circuit 20 assumes a high level. Consequently, the PCUTTR 22 is turned off so that the second control input terminals $C_2$ of the motor exciting circuits 8–11 assume a low potential, irrespective of the potential level of the first control input terminal $C_1$, whereby the EXTR's 8a–11a are forcedly turned off and held off. Further, in the event that the line $COM_1$ is shorted to ground (hereinafter referred to as "grounding"), the pulse duty factor becomes 0%, and accordingly the output of the LDTY circuit 21 assumes a high level. Consequently, the OR circuits 15, 14 generate high level outputs, whereby the CHOPTR's 6, 7 are forcedly turned off and held off.

The CPU 17 has another output port $P_4$ connected to the base of a fault diagnosis transistor (hereinafter referred to as "CHKTR") 23. The CHKTR 23 has its emitter connected to a line connecting between the ignition switch 2 and the relay 3, and its collector connected to the anodes of diodes 25 and 26. The diodes 25, 26 have their cathodes connected to the lines $COM_1$, $COM_2$, respectively. The CHKTR 23, the resistance 24, and the diodes 25, 26 form a circuit for carrying out a fault diagnosis in response to a control signal from the CPU 17. The CHKTR 23 is normally held off.

The operation of the stepping motor driving circuit constructed as above will now be described.

When the ignition switch 2 is closed, the CPU 17 carries an initial fault diagnosis operation. If no fault is detected as a result of the diagnosis operation, the CPU 17 causes the FSRTR 5 to conduct so that the switch element 3b of the relay 3 is closed, whereby the stepping motor 4 is brought into an operable state. Even after completion of the initial fault diagnosis operation, the CPU 17 carries out a predetermined fault diagnosis operation at regular time intervals during operation of the stepping motor driving circuit, except when the stepping motor 4 is actually driven.

While no fault diagnosis operation is carried out by the CPU 17, the output ports $P_4$, $P_6$ of the CPU 17 are held at a high level, while the output ports $P_7$, $P_8$ are held at a low level. Further, on this occasion, the output port $P_5$ of the CPU 17 supplies a pulse signal having a pulse duty factor variable with output vol±age from the battery I so that pulse signals are delivered from the CHOPTR's 6, 7 to the lines $COM_1$, $COM_2$, which have pulse duty factors controlled within the range of 3% to 93%. Therefore, on this occasion, the HDTY circuit 20 and the LDTY circuit 21 both generate low level outputs so that the PCUTTR 22 is held in on state, and the OR circuit 14 generates an output exactly corresponding to output from the output port $P_5$ of the CPU 17.

When driving pulse signals for driving the stepping motor 4 are generated from the output ports $P_9$-$P_{12}$ of the CPU 17, the respective EXTR's 81a-11a are correspondingly turned on and off to apply driving pulses to the excitation coils 41-44 to thereby cause rotation of the stepping motor 4.

If there occurs a short circuit between the collector and the emitter of the CHOPTR 6, i.e. between the line $VP_1$ and the line $COM_1$, the HDTY circuit 20 generates a high level output, as mentioned before, to turn the PCUTTR 22 off. Accordingly, the second control input terminals $C_2$ of the motor exciting circuits 8-11 assume a low potential so that the EXTR's 8a-11a are forcedly turned off and held off, irrespective of the potential level assumed by the first control input terminals $C_1$, to thereby prevent excessive current from flowing to the excitation coils 42, 44 and the EXTR's 8a, 9a to do damage to them, such as burning.

The same operation as described above takes place also in the event of a short circuit between the lines $VP_2$ and $COM_2$.

On the other hand, in the event that the line $COM_1$ is shorted to ground, the output from the LDTY circuit 21 goes high, and accordingly the OR circuits 15, 14 generate high level outputs so that the CHOPTR's 6, 7 are forcedly turned off and held off, to thereby prevent excessive current from flowing to the CHOPTR 6 to do damage to them, such as burning.

The same operation as above also in the event of grounding of the line $COM_2$.

FIG. 4 shows a fault diagnosis program which is executed by the CPU 17.

First, at a step S1 the FSRTR 5. the CHOPTRs 6, 7, the EXTR's 8a-11a, and the CHKTR 23 are all turned off, that is, the output ports $P_6$, $P_9$-$P_{12}$ are caused to generate low level outputs, and the output ports $P_4$, $P_7$ and $P_8$ are caused to generate high level outputs. Then, it is determined at a step S2 whether or not the level of input to the input port $P_3$ is low. If the answer is affirmative or yes, it is judged at a step S3 that there is a disconnection in the wiring between the ignition switch 2 and the input port $P_3$, and then a failsafe program, not shown, for carrying out warning, etc. is executed. If the answer to the question of the step S2 is negative or No, that is, if the level of input to the input port $P_3$ is high, it is determined at a step S4 whether or not the line $COM_1$ or $COM_2$ has a high potential. This determination is made by determining whether or not the level of input to the input port $P_1$ is high. If the answer is yes, this means that the line $COM_1$ or $COM_2$ has a high potential, in spite of the fact that the switch element 3b, and the CHOPTR's 6, 7 are held off. Accordingly it is judged that the CHKTR 23 has a short-circuit (a short-circuit between the emitter and the collector), and then the failsafe program is executed.

If the answer to the question of the step S4 is No, the CHOPTR's 6, 7 are turned on by causing the output ports $P_5$, $P_7$, and $P_8$ to generate low level outputs, and the FSRTR 5, the EXTR's 8a-11a, and the CHKTR 23 are held off at a step S6, and then it is derermined at a step S7 whether or not the line $COM_1$ or $COM_2$ has a high potential. If the answer is Yes, this means that the line $COM_1$ or COM has a high potential, in spite of the fact that the FSRTR 5 is held off to cut off the supply of current to the coil 3a of the relay 3. Accordingly, it is judged at a step S8 that the switch element 3b of the relay 3 is faulty or fused (closed), then executing the failsafe program.

If the answer to the question of the step S7 is No, the FSRTR 5 and the CHKTR 23 are turned on, the CHOPTR's 6, 7 are turned off, and the EXTR's 8a-11a are held off at a step S9, and it is determined at a step S10 whether or not the line $COM_1$ or $COM_2$ has a low potential. This determination is made by determining whether or not the level of input to the input port $P_2$ is high. If the answer to the question of the step S10 is yes, this means that the line $COM_1$ or $COM_2$ has a low potential, in spite of the fact that the CMKTR 23 has been turned on. Accordingly, it is judged at a step S11 that the line $COM_1$ or $COM_2$ is shorted to ground or at least one of the EXTR's 8a-11a has a short-circuit, whereby the failsafe program is executed.

If the answer to the question of the step S10 is No, the program proceeds to steps S12 et seq. At the step S12 through a step S23, the FSRTR 5 and the CHKTR 23 are held on, the CHOPTR's 6, 7 are held off, and the EXTR's corresponding respectively to the excitation coils 41-44 of the stepping motor 4 are successively turned on while fault diagnosis is carried out.

First, the EXTR 10a corresponding to the first phase excitation coil 41 is turned on while the other EXTR's 8a, 9a, and 10a are held off at the step S12, and then it is determined at a step S13 whether or not the line $COM_1$ or COM has a high potential. If the answer is yes, this means that the line $COM_2$ has a high potential, in spite of the fact that the EXTR 10a has been turned on. Accordingly, it is judged at a step S14 that there is a disconnection in the wiring between the line $COM_2$, the first phase excitation coil 41, a line $PW_1$ connecting between the EXTR 10a and the excitation coil 41, the EXTR 10a, the line $PG_2$, and ground, whereby the failsafe program is executed.

At steps S15, S18, and S21, the EXTR's 8a, 11a and 9a are turned on, respectively, while the other EXTR's are turned off or held off, and then it is determined at steps S16, S19, and S22 whether or not the line $COM_1$ or $COM_2$ has a high potential. If the answer to any of the questions of these steps is yes, it is judged at a corresponding step S17, S20, or S23 that there is a disconnection in the wiring between the line $COM_1$, the line $PW_2$, and the line $PG_1$, between the line $COM_2$, the line $PW_3$, and the line $PG_2$, or between the line $COM_1$, the line $PW_4$, and the line $PG_1$, whereby the failsafe program is executed.

If the answer to the question of the step S25 is No, the FSRTR 5 is held on, the CHOPTR 6 is turned on, and the CHOPTR 7, the EXTR's 8a-11a, and the CHKTR 23 are turned off or held off, at a step 24, and then it is determined at a step S25 whether or not the line $COM_1$ or $COM_2$ has a low potential. If the answer is Yes, this means that the line $COM_1$ has a low potential, in spite of the fact that the FSRTR 5 is held on (i.e. the switch element 3b is on), and all the EXTR's 8a-11a are held off. Accordingly, it is determined at a step S26 that there is a disconnection in the line $VP_1$, whereby &he failsafe program is executed.

If the answer to the question of the step S25 is No, reversely to the state set in the step S24, the CHOPTR 7 is turned on and the CHOPTR 6 is turned off, at a step S27, and then it is determined at a step S28 whether or not the line $COM_1$ or $COM_2$ has a low potential. If the answer is yes, it is judged at a step S29 that there is a disconnection in the line $VP_2$, for a similar reason to that used in the step S26, whereby the failsafe program is executed.

If the answer to the question of the step S28 is No, the FSRTR 5 is held on, the EXTR's 10a and 8a are turned on, the EXTR's 9a, 11a are held off and further the CHOPTR's 6, 7 are turned on and off such that the signals on the lines $COM_1$ and $COM_2$ have pulse duty factor values of 5%, at a step S30. Then, it is determined at a step S31 whether or not the line $COM_1$ or $COM_2$ has a high potential. If the answer is yes, it is judged at a step S32 that the CHOPTR 6 or 7 is faulty or has a short-circuit, whereby the failsafe program is executed.

If the answer to the question of the step S31 is No, it is further determined at a step S33 whether or not the line $COM_1$ or $COM_2$ has a low potential. If the answer is Yes, it is judged at a step S34 that the CHOPTR 6 or 7 is faulty or has a disconnection between the emitter and the collector, whereby the failsafe program is executed.

If the answer to the question of the step S33 is No, this means that there is no fault in the driving circuit, and then the stepping motor 4 is made ready to be driven. In this state, as driving pulses are generated from the output ports $P_9$–$P_{12}$ of the CPU 17, the stepping motor 4 is rotatively driven.

In the above described fault diagnosis program, determinations as to faults at all the points in the circuit are executed immediately after the ignition switch is turned on (Initial Fault Diagnosis). Thereafter, the determinations at the steps S9 et seq. are repeatedly executed at regular time intervals of e.g. 15 milliseconds (Normal Operation Fault Diagnosis).

In the above described fault diagnosis program, by turning on and off the CHKTR 23, the supply of a small amount of current to the stepping motor 4 and its related parts is effected and cut off, respectively, wherein the output levels of the CHOPTR's 6, 7, i.e. the potential levels of the lines $COM_1$ or $COM_2$ are checked. This enables to accurately detect faults in the driving circuit without actually driving the stepping motor 4, thereby avoiding the stepping motor and its related parts from being broken or damaged by overcurrent and realizing prompt detection of electrical faults.

Although in the above described embodiment, two chopping transistors, i.e. CHOPTR 6 which controls the supply of current to the second phase excitation coil 42 and the fourth phase excitation coil 44 of the stepping motor 4, and the CHOPTR 7 which controls the supply of current to the first phase excitation coil 41 and the third phase excitation coil 43, this is not limitative, but only one chopping transistor may be provided to control the supply of current to all the first phase to the fourth phase excitation coils.

What is claimed is:

1. A driving circuit for driving a stepping motor having a plurality of excitation coils having different phases, comprising:
    a plurality of excitation transistors for driving said excitation coils of said stepping motor, respectively;
    at least one chopping transistor for effecting chopping control of current flowing to said excitation coils;
    a serial circuit comprised of a fault diagnosis transistor and current limiting means;
    said serial circuit being connected in parallel with said chopping transistor;
    switching control means for selectively turning on and off said fault diagnosis transistor;
    output state detecting means for detecting output states of said chopping transistor assumed respectively when said fault diagnosis transistor is turned on and turned off; and
    fault detecting means for comparing the detected output levels of said chopping transistor with respective predetermined logic levels and detecting faults in said driving circuit from results of said comparisons.

2. A driving circuit as claimed in claim 1, wherein said current limiting means comprises a resistance.

3. A driving circuit as claimed in claim 1, including a power supply, said chopping transistor, said excitation coils of said stepping motor, and said excitation transistors being serially connected between said power supply and ground, and second switching control means operable in unison with switching operation of said first-mentioned switching control means for selectively turning on and off said chopping transistor and said excitation transistors.

4. A driving circuit as claimed in claim 3, including switch means connected between said power supply and said chopping transistor, said excitation coils of said stepping motor and said excitation transistors, and wherein when said second switching control means turns said chopping transistor off while said switch means is closed, said first-mentioned switching control means turns said fault diagnosis transistor on.

5. A driving circuit as claimed in claim 4, wherein when said second switching control-means turns said chopping transistor off, said second switching control means turns off all of said excitation transistors or successively turns said excitation transistors on, whereby said output state detecting means and said fault detecting means detect detect faults at different places in said driving circuit.

6. A driving circuit as claimed in claim 3, including switch means connected between said power supply and said chopping transistor, said excitation coils of said stepping motor and said excitation transistors, and wherein when said second switching control means turns said chopping transistor on while said switch means is closed, said first-mentioned switching control means turns said fault diagnosis transistor off.

7. A driving circuit as claimed in claim 6, wherein when said second switching control means turns said chopping transistor on, said second switching control means turns all of said excitation transistors off or successively turns said excitation transistors on, whereby said output state detecting means and said fault detecting means detect detect faults at different places in said driving circuit.

8. A driving circuit as claimed in claim 7, wherein said chopping transistor comprises a plurality of chopping transistors, and said second switching control means turns on a different one of said chopping transistors and at the same time turns all of said excitation transistors off.

9. A driving circuit as claimed in claim 7, wherein said second switching control means turns said chopping transistors on and off with a predetermined small pulse duty factor and at the same time turns on at least predetermined one of said excitation transistors.

* * * * *

UNITED STATES PATENT AND TRADEMARK OFFICE
CERTIFICATE OF CORRECTION

Figure 4B:
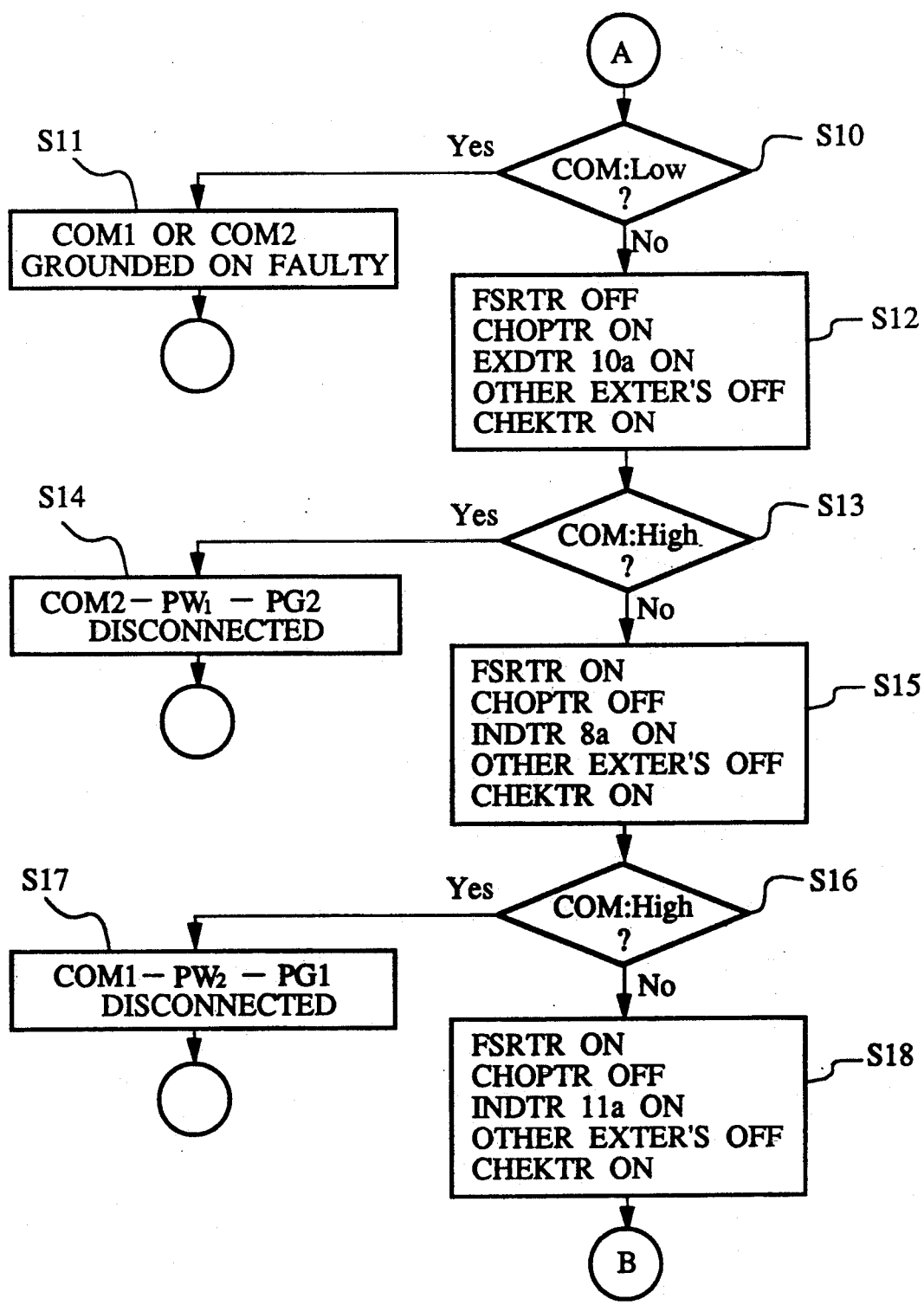
FIGS. 4a–4d are flowcharts showing a fault diagnosis program executed by a central processing unit (CPU) appearing in FIG. 1.
Figure 4C:
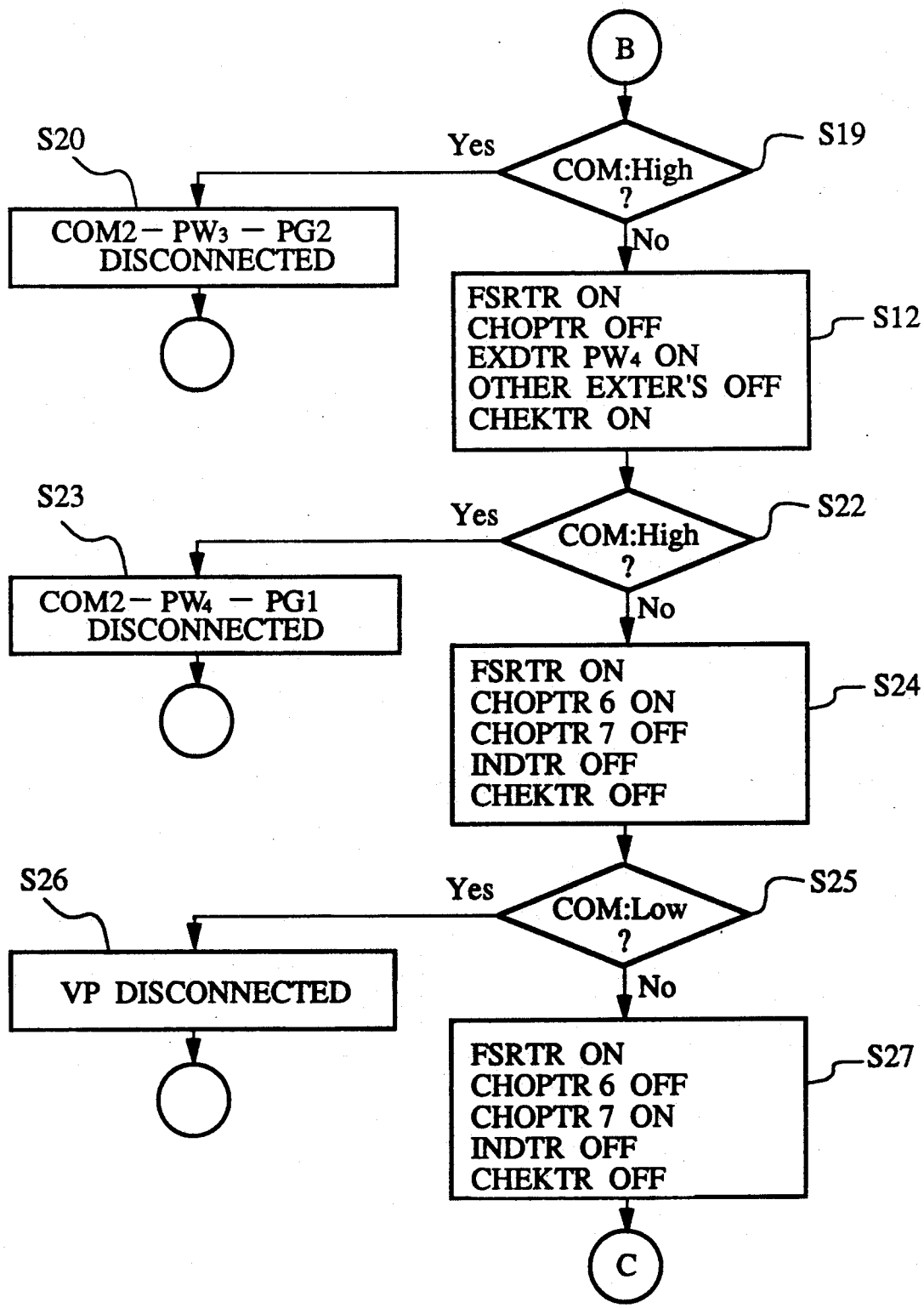
Figure 4D:
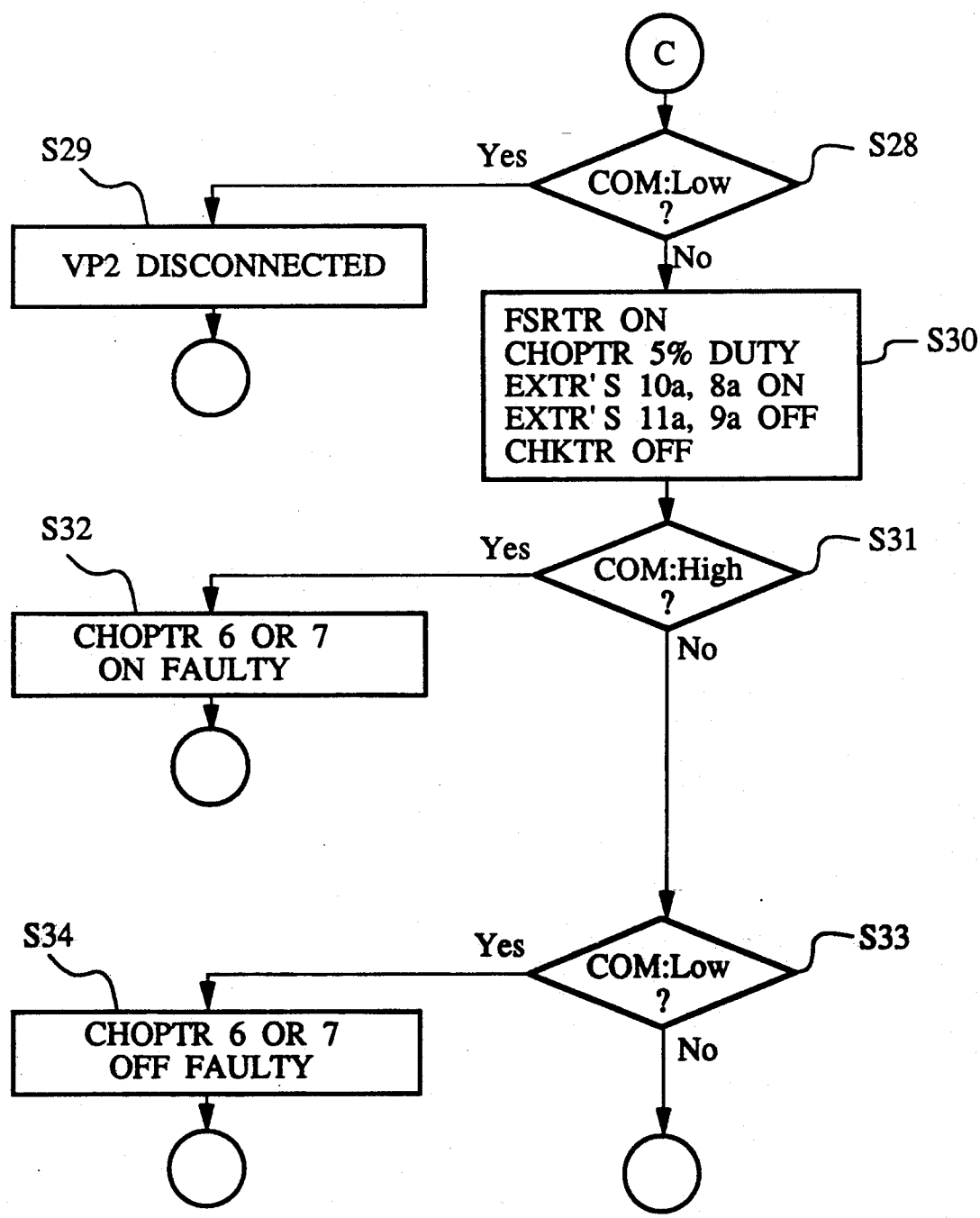
Figure 4A:
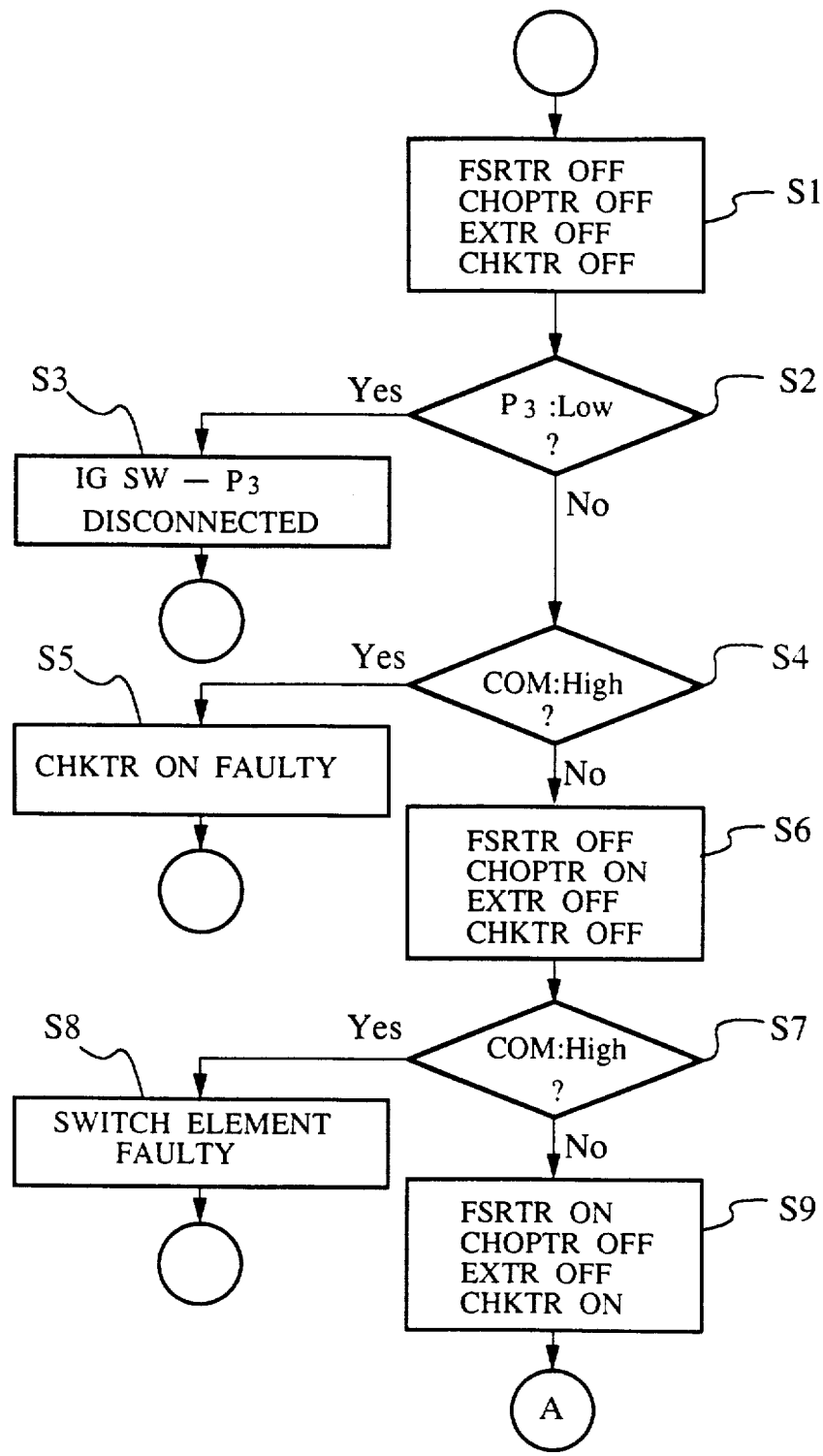
Figure 4B:
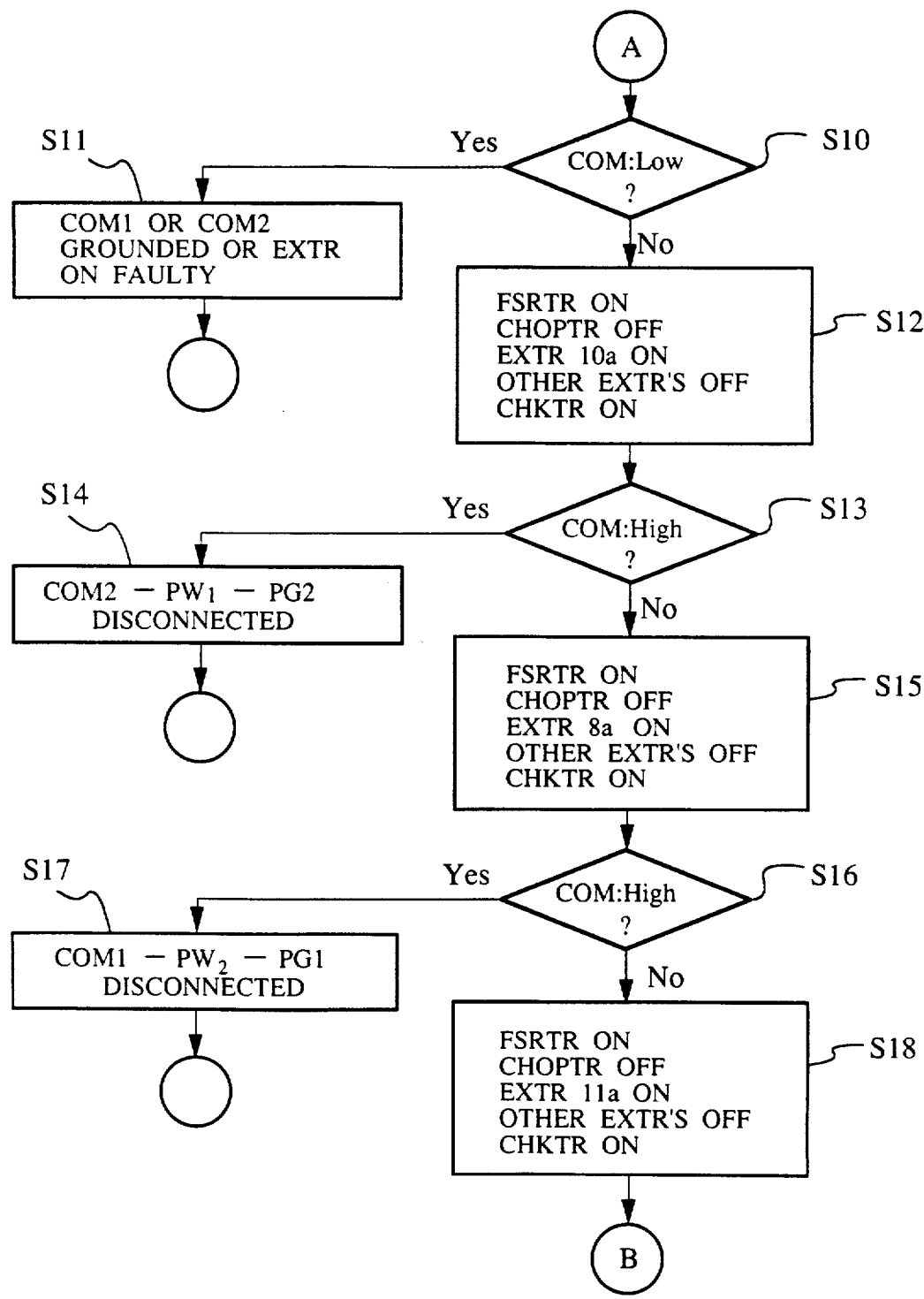
Figure 4C:
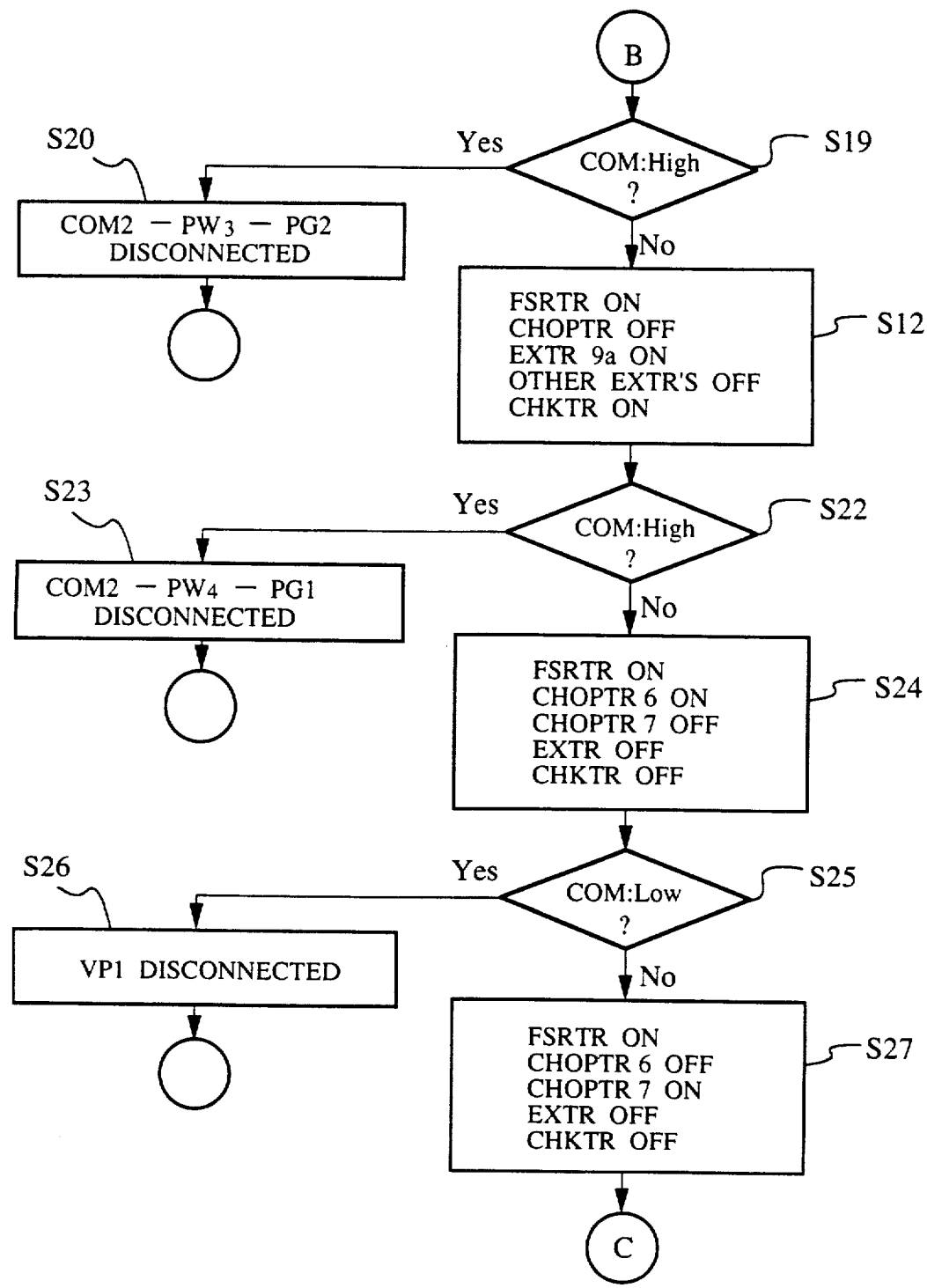

PATENT NO. : 5,182,507
DATED : Jan. 26, 1993
INVENTOR(S) : Yukihisa Ishii, et al It is certified that error appears in the above-indentified patent and that said Letters Patent is hereby corrected as shown below:

The drawing sheets, consisting of Figs. 4a-4c, should be deleted to be replaced with the drawing sheets, consisting of Figs. 4a-4c, as shown on the attached pages.

Signed and Sealed this

Fifth Day of July, 1994

*Attest:*

BRUCE LEHMAN

*Attesting Officer*   Commissioner of Patents and Trademarks